March 26, 1968 U. KLAVSONS ET AL 3,375,528
RECORDING PEN HAVING A PLURALITY OF CLOSELY SPACED WIRES
Filed May 7, 1965 3 Sheets-Sheet 1

INVENTORS
ULDIS KLAVSONS
JAMES E. KENNEDY
BY
ATTORNEY

March 26, 1968 — U. KLAVSONS ET AL — 3,375,528
RECORDING PEN HAVING A PLURALITY OF CLOSELY SPACED WIRES
Filed May 7, 1965 — 3 Sheets-Sheet 2
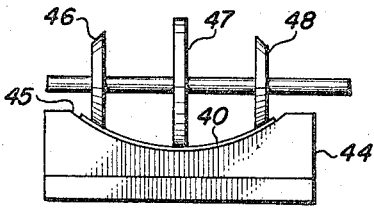
FIG. 6
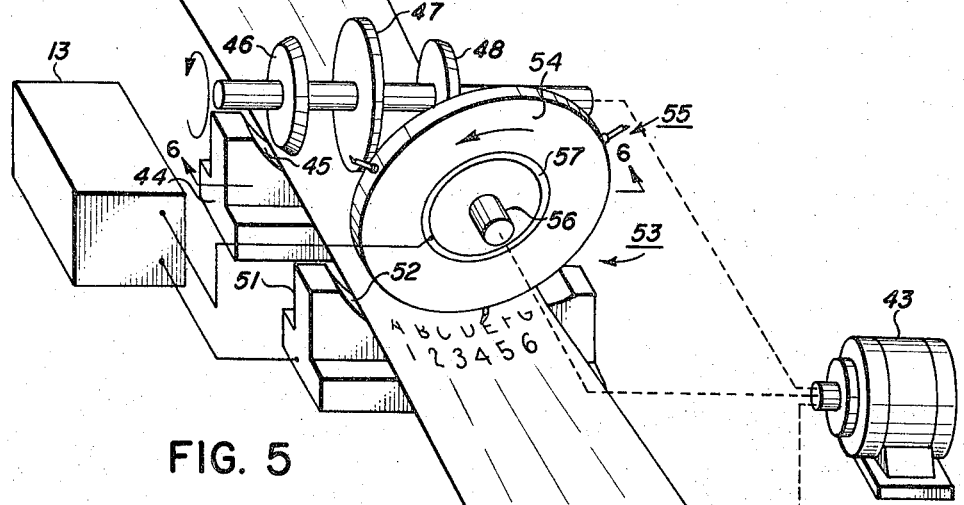
FIG. 5
FIG. 8
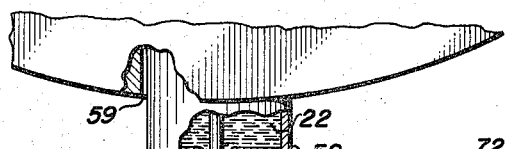
FIG. 7
FIG. 7a
INVENTORS
ULDIS KLAVSONS
JAMES E. KENNEDY
BY Anthony D. Cennamo
ATTORNEY

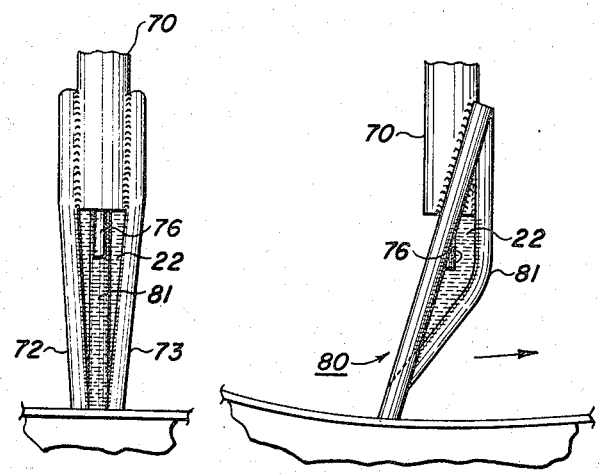

United States Patent Office 3,375,528
Patented Mar. 26, 1968

3,375,528
RECORDING PEN HAVING A PLURALITY
OF CLOSELY SPACED WIRES
Uldis Klavsons, Penfield, and James E. Kennedy, East
Rochester, N.Y., assignors to Xerox Corporation, Rochester, N.Y., a corporation of New York
Filed May 7, 1965, Ser. No. 453,960
21 Claims. (Cl. 346—140)

ABSTRACT OF THE DISCLOSURE

A liquid ink recording apparatus which deposits ink on a recording surface when the surface tension of the ink is overcome by an electrical signal wherein the ink dispensing means includes closely spaced wires extending to the recording surface from an ink reservoir and which retain ink by surface tension in the spaces between the wires.

Background of the invention

This invention relates to electrostatic recording and in particular, to novel pen apparatus for recording with liquid ink in response to electrical intelligence signals.

Prior art devices for recording with liquid ink generally are of three basic types. A first type operates with physical contact between an ink fed stylus and a recording surface with the stylus being physically removable from the recording surface on receipt of an appropriate signal. Physical removal is difficult to control at high speeds and with a fast flow of intelligence requires a highly damped, relatively nonelastic mechanical system. The large amount of distortion-free power required to operate such a system at speeds of 10 kc. or higher results in high initial cost and a very low level of operating efficiency.

A second type is referred to as "ink spitters" and includes devices in which ink is transferred across a gap from a point or orifice onto a recording surface. They are generally responsive to an electrical signal or to a controlled pressure in the feed system. Ink spitters are limited by the energy requirements to move a particle across a gap. Problems associated therewith and which must be overcome are inertia and surface tension, both of which are extremely difficult at high frequency rates. For example, in droplet sizes suitable for recording purposes, it is estimated that the potential required to move drops across a one mil gap at 10 kc. is in the range of 30,000 volts per cm. which is also about the potential required to produce undesirable air breakdown. If it is also necessary to completely overcome surface tension by electrical potential, the usable frequency is greatly reduced.

The last of the different prior art types is one in which an ink fed stylus is maintained in constant contact with a recording sheet and is moved relative thereto in order to record information. Like the first mentioned type, this provides a continuous mark on the recording surface at all times when the stylus and recording surface are in contact. This last type has been largely limited in practical applications to oscillographic use since the mechanical complexity has been regarded as too prohibitive to control a continuously marking stylus through the tortuous configurations necessary for more sophisticated writing.

It becomes apparent therefore that a device in which the stylus remains in continuous contact with a copy sheet while ink is transferred only on command approaches the ideal. It should be recognized in this regard that operating characteristics for providing ready flow of ink on command are analogous to those for providing continuous flow from a stylus in contact with a relatively moving recording surface and opposite of those desirable for rapid interruption of ink flow on command. Attempts to resolve this by prior art techniques have been generally unsuccessful and have included techniques such as disclosed in U.S. 1,550,048 in which a colorless ink flows continuously to the recording surface, but becomes strongly visible only when subjected to an electric current as it separates from the stylus.

Summary of the invention

Now in accordance with the present invention, rapidly interruptable ink flow from a stylus in continuous moving contact with a recording sheet has been overcome. This is accomplished in accordance herewith by the application of a direct high voltage intelligence signal between an ink bearing recording stylus and a recording sheet with which the stylus is in contact while employing novel stylus structure selectively responsive to the emitted signal to deposit ink on the receipt thereof. By the different embodiments hereof, recording can be effected onto either a recycled or a continuously fed rescording sheet. Thus, it is an object of the present invention to provide novel liquid ink recording system.

It is a further object of the present invention to provide novel styli for controlling ink deposition onto a recording member with which the stylus is in continuous moving contact.

The description of the drawings

Further objects and features of the invention will become apparent upon reading the following description in conjunction with the drawings wherein:

FIG. 5 is an isometric view of a second embodiment recording apparatus in accordance with the invention employing a continuously fed recording sheet;

FIG. 6 is a sectional elevation taken substantially along the lines 6—6 of FIG. 5;

FIGS. 7, 7a, and 8 are enlarged side, front, and back views respectively of a recording stylus for use in FIG. 5; and FIGS. 9 and 10 are enlarged side and back views respectively of an alternative recording stylus for use in FIG. 5.

Description of the preferred embodiments

Figure 1:
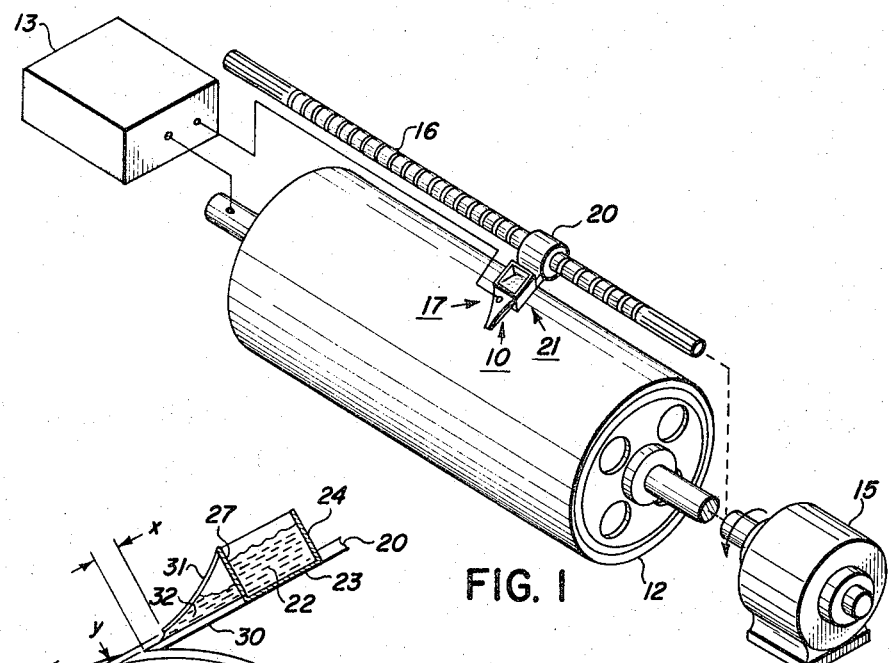
FIG. 1 is an isometric view of a first embodiment recording apparatus in accordance with the invention employing a recycling recording sheet.
Figure 2:
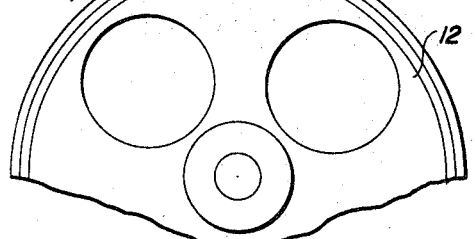
FIG. 2 is a sectional elevation through the recording apparatus of FIG. 1.
Figure 3:
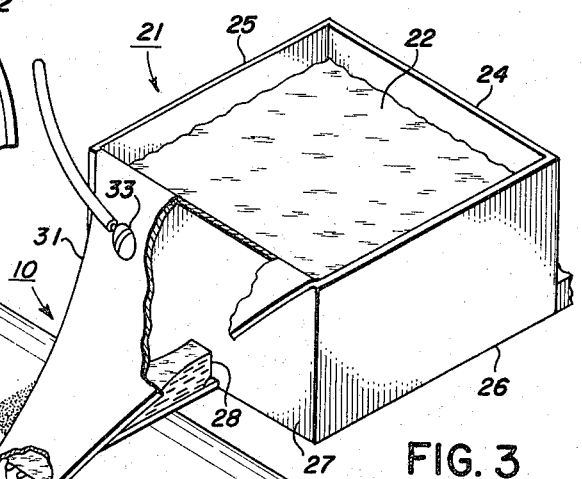
FIG. 3 is an enlarged isometric view of the recording stylus of FIG. 1.
Figure 4:
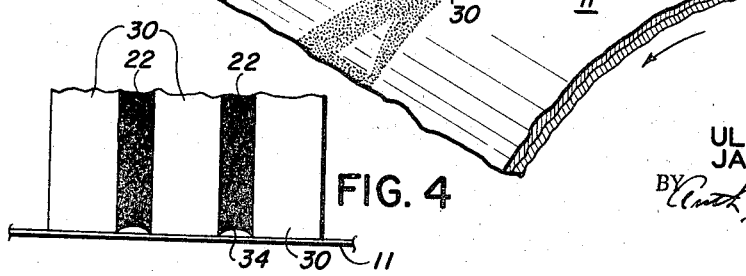
FIG. 4 is an enlarged front view of the stylus of FIG. 1.

Referring now to the first embodiment hereof illustrated in FIGS. 1–4, the apparatus is operative with relative motion being maintained between an ink carrying stylus 10 and a recording sheet 11 mounted on the periphery of a conductive drum 12. The recording sheet can comprise paper, plastic, or other suitable sheet material preferably having an electrical resistivity of about 1,000 ohms/cm. or higher. With sheets having this resistivity excessive current drain through the paper can be prevented to avoid undue load on the signal source as will be understood.

Information to be recorded is provided in the form of intelligence signals from a signal source 13 which applies a recording potential between stylus 10 and drum 12 during continuous rotation of the latter via a motor 15. Motor 15 likewise drives helical feed screw 16 arranged axially parallel to the drum and upon which recording pen 17 carrying stylus 10 is mounted so as to drive stylus 10 across the surface of the recording sheet in a direction perpendicular to the rotational path of the drum.

By the appropriate position of the feed screw relative to the drum axis the recording pen can be supported at about 30°–60° to the horizontal with the stylus in continuous contact with the recording sheet.

Recording pen 17 includes a shank 20 having a bossed upper end axially turned to provide the female counterpart for lead screw 16. On the lower end of the shank there is integrally attached an open box-like ink reservoir 21 for containing a quantity of liquid ink 22. The reservoir comprises bottom wall 23, rear wall 24, side walls 25 and 26 and front wall 27. Formed in the front wall is an orifice opening 28 through which ink in the reservoir can gravitationally be dispensed onto stylus 10. Orifice sizes found feasible, although not limiting, are about $\frac{1}{32}$ inch square which will, in the embodiment being described, result in a liquid head at the stylus tip of about $\frac{1}{16}$ to $\frac{1}{4}$ inch. As can be appreciated, the liquid head is critical to the extent that insufficient head would not provide ready availability of ink while excessive head would cause unwanted flow. These limitations will of course vary with the features of construction as well as the viscosity of the ink.

Stylus 10 is integrally attached to the front wall 27 of the reservoir as to be downward dependent therefrom for riding in continuous seat-like contact against copy sheet 11. In contact against the copy paper are the ends of a plurality of finely divided, parallel spaced wire electrodes 30 extending substantially coplanar from the bottom wall of the reservoir and terminating angularly cut at their ends to provide the necessary contacting surface. The electrode length is not critical, but should at least be adequate to provide some springing. This insures continuous contact in a compensating manner over any irregularities that may exist on the surface of the copy sheet.

Extending from the top face of the reservoir front wall is a lip member 31 bent convex and generally asymptotically approaching the electrodes below to form an ink pocket 32 therebetween. Conveniently located on the top surface of the lip is a terminal 33 to which signals emitted from source 13 are transmitted. The materials of lip 31 should be characterized by mechanical rigidity and can be electrically conductive or insulating. With the latter, terminal 33 is placed elsewhere. As will be described below, receipt of a signal causes breaking of the meniscus from the ink pocket to deposit ink from the electrodes onto copy paper 11 while in the absence of a signal, there occurs a complete retention or discontinuance of ink flow therefrom.

The lip member to a large extent seems to control the surface tension for the ink radius at the electrode tips. This can be better understood by specific reference to FIG. 4 whereat the ink retention mode is shown with an ink meniscus 34 formed in the interstices of the electrodes. As can be seen, a finite line of ink at the edges of the electrodes is in continuous non-wetting contact with the paper surface while the central portion rises just above the paper surface. Terminating the lip further removed from the electrode tips (X, FIG. 2) appears to further remove the ink from the recording surface effecting lower frequency response and reduced ink deposition. The contra appears likewise true in that reduced spacing effects an opposite result. At the same time a change in the dimension Y (FIG. 2) has a less pronounced effect on operability except that at very close spacings of a few mils or less deposition decreases and becomes increasingly erratic.

Accordingly, the ink is held in the absence of a signal by surface tension forces assisted by the nib of the lip to draw the ink to the tips of the electrodes. The reservoir maintains the pocket filled with ink and the lip provides a ready reserve to reform the meniscus after deposition. A capillary (not shown) could be used instead of or in conjunction with the reservoir to maintain the ink supply.

On receipt of a signal from source 13, termed the "ink deposition mode," the pulse is believed to charge the ink surface and effectively reduce surface tension. At the same time opposite charges are believed induced through the drum to produce coulomb attraction to the paper surface, causing ink to flow thereto from between each of the electrode pairs until the signal pulse is removed. Discontinuance of the signal restores the ink meniscus and the separate deposits from each electrode pairs is caused to merge by the directional movement of the stylus relative to the copy sheet.

The physical relationships of the stylus components have therefore been found to at least partially be a function of the line width to be printed with each emitted signal at the selected operating speed. At pen to paper speeds from about 10 to 500 inches per second and above, three electrodes 30 of about 3 to 5 mil wire with an edge-to-edge generally parallel spacing or slightly convergent of about 1 to 4 mils and a lip terminating about 0.020–0.040 inch (Y, FIG. 2) above the electrodes and about 0.020–0.040 inch from the ends thereof (X, FIG. 2) are capable with a 1,000 volt signal of producing line widths of about 0.010 inch without perceptible dragout.

For 0.010 line width 3-mil wire at about 1½ mil spacing appear to give optimum results as do 4 mil wire at 2 mil spacing for 0.014 inch line width. Spacings above maximum appear to increase dragout, i.e., undesirable ink deposition beyond the extent intended. With the electrodes sized as above, length of about 40 to 100 mils is adequate. Contact force should ordinarily be up to about 0.2 pound.

The ink composition employed herewith is not critical and can comprise various commercial, electrically conductive ink preparations, such as conventional stamp pad inks, which have been used successfully. Specially prepared inks included an ink made by mixing 50–50 by volume "Skrip" #34 jet black available from the W. A. Sheaffer Pen Company with John R. Bourne Company, black stamp ink available from John R. Bourne Company, Rochester, N.Y. The viscosity of the ink can vary over a wide range. For lower operating speeds of about 10 inches per second viscosity ranges of about 100–200 centipoises was found optimum and which decreased to about 10 and 4 centipoises for 200 and 500 inches per second respectively. The above mixture results in a viscosity of about 8 centipoises. These viscosity ranges are not regarded as critical and can be varied as a function of the other variables described herein.

The applied signal voltage emitted from source 13 can be AC or pulsed DC and has a preferred range of about 800–1,500 volts. Higher density and greater uniformity are achieved as the voltage is increased toward 1,500 volts. Over 1,500 volts, the electrical components become substantially more expensive and the choice of a recording sheet material becomes critical to avoid dielectric breakdown. The threshold for ink deposition using 3 mil common paper for recording is about 200 volts. This varies with conductivity and thickness of the paper. The electric current is a more significant figure and may range from about 0.5 microampere to 5 microamperes for continuous writing with a direct current potential. Lower current produces poor density and higher current gives a splattering effect that results in dragout and poor resolution.

In operation of the above described embodiment, a recording sheet 11 is wrapped around drum 12 with pen 17 positioned at one edge thereof while ink is supplied to the pen from reservoir 18. Drum 12 is rotated at a high rate and the pen is advanced synchronously across the drum by feed screw 16 while a properly synchronized electrical signal is applied between stylus 10 and drum 12. This electrical signal is appropriately a facsimile signal, but may also be a computer output or other electrical signal capable of intelligence interpretation on paper.

Refer now to FIGS. 5–8 in which there is illustrated a second embodiment of recording system in accordance with the invention as adapted for continuous stylus contact on a continuously advancing, non-recycling recording sheet. In this embodiment, a quantity of recording member in the form of web sheet 40 is stored on a supply roll 41 from which it is advanced at a uniform linear rate onto takeup roll 42 being driven by motor 43. On advancing off the supply roll, the surface of the recording sheet is substantially planar and generally remains so until passing over a platen 44 having a semi-circle, concaved top surface 45. As the web sheet passes over platen 44, it is engaged in its topside by coaxially mounted drive rollers 46, 47 and 48 likewise being driven by motor 43 and which urge the recording sheet against the circular contour of the platen to assume the shape thereof as illustrated specifically in FIG. 6. The curved shape of the recording member thus formed radially corresponds to a recording member 53 as will be described and as such is maintained as it continues to advance past a recording station designated 50. After passing the recording station it then assumes a restored planar surface relation passing onto the takeup roll. Where the drive rollers have sufficient surface traction to advance the web sheet continuously, takeup roll 42 can be dispensed with.

The recording station includes a support platen 51 having a top surface 52 arranged parallel and geometrically similar to surface 45 and to which one lead of signal source 13 is connected. When passing over platen 51 the web sheet is subjected to a continuous contact from the stylus of a recording pen 55 contained on rotating recording head 53, the circumferential path of which corresponds to the curved shaped formed of the web sheet.

Recording head 53 is comprised of a cylindrical disk or turret 54 mounted for rotation about an axle 56 being rotated by motor 43 and arranged with the axis thereof extending parallel to the direction of movement of the web sheet. On the front surface of the turret there is a ring electrode 57 to which the opposite lead from signal source 13 is connected in continuous wiping contact. Supported about the periphery of the turret are one or more recording pens 55 equally displaced angularly thereabout. The number of pens whether one or more depends for a given relative speed upon the width and curvature of the web sheet and follows the basic formula for the number of pens $N = 2\pi x$ radius of paper curvature/paper width. Accordingly, an overall recording head circumference of about 25.5 inches for the given condition requires 3 pens while a 34 inch circumference requires 4 pens. This ensures that at least one stylus thereof is always maintained in continuous contact with the recording sheet as it passes thereunder.

Each recording pen includes an ink reservoir 58 that is pressure fit into a radially cut recess 59 in the periphery of the turret. Each reservoir is itself pressure tight for maintaining the liquid ink 22 therein against the centrifugal forces of acceleration incurred during the rotation of the turret member. A removable pressure tight cap 60 permits adding of liquid ink into the reservoir. An orifice 61 in the topmost surface of the reservoir permits ink dispensing therefrom and about which is coaxially attached a capillary tube 70 extending a distance approximately ¼ to 2 inches.

On the outermost end of each pen is an ink stylus 71 by which ink is retained in the absence of a signal and deposition is effected on receipt of a signal. The stylus in the embodiment being described is comprised of a pair of slightly resilient electrode wires 72 and 73 secured on opposite sides to the capillary 70 as by brazing or cementing, and are radially offset obliquely in a plane from the rotative direction of the turret. Extending from the capillary sides, the electrodes converge to form an internal apex 74 (FIG. 7a) just behind the point of touch which is a continuous pressure engagement to avoid any gap therebetween. The angled tips 75 of the electrodes are adapted during rotation for continuous contacting of the surface of the recording sheet such that ink deposition occurs from the meniscus at the apex finely in non-wetting contact with the recording sheet as above and not from between the electrodes per se.

Extending coaxially through the capillary from in contact with the liquid ink in the reservoir partially into the V formed between the stylus electrodes is a thin wire 76. This serves to restrict the dispensing ink flow against the centrifugal forces of rotation, such that ink will completely fill the V without overflowing or spilling. With the electrodes in continuous pressure engagement against each other wear on the tips occurs uniformly against both electrodes and their spring tension maintains them together to form a fixed rotative path of apex 74.

The dimensional parameters of the elements, the number of recording pens, the ink viscosity as well as other features can be caused to vary as a function of their relative rates between the turret and recording member as well as the acceleration forces on the ink associated with the selected rotational rate of the turret member. It is essential, therefore, that sufficient surface area be provided to effect surface tension forces able to withstand the acceleration forces without ink spillage. In a constructed embodiment, three recording pens 55, 120° displaced, included styli electrodes 72 and 73 of 4 to 10 mil music wire to form a V converging at approximately 5 to 30 degrees from the exterior of a #24 to #26 capillary 70 with a central wire 76 of about 5 mils. The nib of each stylus was supported at a distance from the turret axis of approximately 4 inches to form a circumferential path of approximately 25.5 inches. On rotating the turret at about 450 to 600 r.p.m. at which the ink experiences acceleration forces of 24 to 40 g's respectively, a paper speed on the order of approximately 0.2 inch per second and a nib pressure on the recording member of up to about ¼ pound, excellent copy was reproduced from intelligence signals from a source ranging from about 200 to 1,500 volts with ink of about 100 centipoises. Whereas it might be expected that the acceleration forces would cause excessive ink spillage, it was found to the contrary that with a stylus constructed in accordance with the above, such did not occur over prolonged periods of operation. With the slight tension maintained between the pressing wires, the apex 74 at which ink deposition occurs, continues to remain closed and wear appears to have imperceptible if any adverse effect on continued sustained operation of the device. With larger capillaries, as for example up to #16, a greater number of central wires are required to control the ink flow against the acceleration forces. For example, with #20 capillary tubing, approximately twelve 5 mil wires equally spaced, were found to effect the desired result.

In operation therefore, ink is retained in the V against the electrodes by surface tension and a meniscus is formed at the apex above the surface of the recording member. As the turret rotates, the stylus of one recording pen is always in continuous contact with the moving recording sheet to deposit ink interruptably in response to a control signal. The path of the stylus is substantially linear relative to the recording sheet such that as one stylus is separating from the recording surface, the next stylus is already in engagement therewith. At the speeds given, about a 10 mil displacement occurs in the printing mode from an absolute perpendicular direction across the recording member. Whatever operating speeds are employed, it is necessary therefore that the stylus geometry provide sufficient surface area to retain the ink against the encountered acceleration forces. This force defined by $g = V^2/384R$ where $V$ = pen velocity at the recording sheet in inches/second and R is the linear distance in inches from the turret axis to the stylus tip.

In FIGS. 9 and 10 there is illustrated a stylus 80 having a geometry which can be suitably substituted for stylus 71 described above. In this embodiment electrodes 72 and 73 are separated by an intermediate similar electrode 81 extending from the side of capillary 70. The electrodes as before converge into a touching tensioned contact to form writing tips 75 with ink being deposited from the apex behind each pair and merged from the action of the tips passing thereover.

By the above description, there is disclosed novel electrostatic recording systems and specifically novel recording styli for use in such systems whereby styli in continuous contact with the recording member are operable to controllably deposit ink only in response to a received intelligence signal. Two embodiments are disclosed, one adapted particularly for a recycling recording sheet and the other for a continuously fed, non-recycling recording sheet and both of which, despite continuous contact, will not supply, in the absence of an appropriate signal, a continuous flow of ink to a relatively moving surface. Instead, in each of the embodiments, the flow of ink is dynamically controlled by an electrical signal with a high order of fidelity having no perceptible dragout. Each of the styli are simple to construct, and have demonstrated a high order of reliability over a wide range of operating speeds.

Since many changes could be made in the above construction and many apparently widely different embodiments of this invention could be made without departing from the scope thereof, it is intended that all matter contained in the drawings and specification be interpreted as illustrative and not in a limiting sense.

What is claimed is:

1. A recording apparatus comprising in combination:
   (a) an electrically conductive support adapted to support a copy sheet on which a recording is to be made;
   (b) a recording pen supported in continuous contact with the surface of a copy sheet on its support, said pen including:
      (1) a plurality of separated elongated electrodes forming a single writing tip arranged adjacent to each other to be capable of retaining by surface tension in the space between them a quantity of liquid ink at the surface of the copy sheet;
      (2) a liquid ink reservoir mounted adjacent to said electrodes and containing a quantity of liquid ink;
      (3) means to dispense ink from said reservoir onto said electrodes at the surface of the copy sheet; and
      (4) a terminal for receipt of a signal voltage electrically coupled to all ink dispensed onto said electrodes;
   (c) drive means operative to effect continuous relative motion between said recording pen and the copy sheet on its support; and
   (d) a signal source connected to said terminal for emitting voltage signals representative of intelligence information to be recorded and of magnitude sufficient to overcome the surface tension of said ink on said electrodes whereby ink retained in all the spaces between said plurality of electrodes deposits onto said copy sheet for the duration of said signal.

2. The apparatus according to claim 1 in which said recording pen is supported on the circumference of a turret mounted for rotative movement about an axis generally parallel to a copy sheet on its support.

3. The apparatus according to claim 1 in which the electrodes of said recording pen are arranged generally parallel to each other and extend into contact with the copy sheet on its support.

4. A recording apparatus comprising in combination:
   (a) an electrically conductive support adapted to support a copy sheet on which a recording is to be made;
   (b) a recording pen supported in continuous contact with the surface of a copy sheet on its support, said pen comprising:
      (1) a plurality of finely separated elongated electrodes extending generally parallel into end contact with the surface of the copy sheet;
      (2) a liquid ink reservoir mounted adjacent to said electrodes and containing a quantity of liquid ink for dispensing onto said electrodes;
      (3) a lip member arranged to extend generally over the length of said electrodes and narrowly spaced therefrom at the ends in contact with the copy sheet and relatively more widely spaced along the length thereof to define a pocket therebetween at which ink dispensed from said reservoir is retained by surface tension;
      (4) a terminal for receipt of a signal voltage;
   (c) drive means operative to effect continuous relative motion between said recording pen and the copy sheet on its support; and
   (d) a signal source connected to said terminal for emitting voltage signals representative of intelligence information to be recorded and of magnitude sufficient to overcome the surface tension on said electrodes whereby ink deposits onto said copy sheet for the duration of said signal.

5. The apparatus according to claim 4 in which said copy support comprises a cylindrical drum mounted for rotational movement and said pen is supported for movement axially parallel to said drum.

6. The apparatus according to claim 4 in which said lip member formed is substantially convex relative to said electrodes asymptotically approaching the copy contacting end portions thereof.

7. In a recording device including an electrically conductive support adapted to support a copy sheet on which a recording is to be made and a signal source for emitting voltage signals representative of intelligence information to be recorded, a recording pen comprising in combination:
   (a) a plurality of finely separated elongated electrodes arranged to extend generally into end contact with the surface of the copy sheet;
   (b) a liquid ink reservoir mounted adjacent to said electrodes and containing a quantity of liquid ink for dispensing onto said electrodes;
   (c) a lip member arranged to extend generally over the length of said electrodes and narrowly spaced therefrom at the ends in contact with the copy sheet and relatively more widely spaced along the length thereof to define a pocket therebetween at which ink dispensed from said reservoir is retained in the absence of a signal from said source by surface tension;
   (d) a terminal for receipt of a signal voltage from said signal source whereby in response thereto ink is caused to deposit onto the surface of the copy sheet for the duration of the emitted signal.

8. The pen according to claim 7 in which said plurality of electrodes comprises at least three.

9. The pen according to claim 8 including in combination a drive means operative to effect continuous relative motion between said recording pen and the copy sheet on its support.

10. The pen according to claim 8 in which said electrodes comprise spaced apart wires having cross-sectional area relative to the surface to surface spacing therebetween of the ratio ¾ to 5.

11. The pen according to claim 10 in which said electrodes have a cross-sectional area of 3 to 5 mils.

12. A recording apparatus comprising in combination:
   (a) an electrically conductive support adapted to support an advancing copy sheet on which a recording is to be made;
   (b) recording means for recording onto said copy sheet in response to voltage signals of intelligence, said recording means comprising:
      (1) turret means mounted for rotation about an axis generally parallel to a copy sheet on its support;
(2) a liquid ink reservoir mounted about the circumference of said turret;
(3) a plurality of separated elongated electrodes each extending outward from the vicinity of said reservoir and converging into tensioned contact at their ends to form a stylus adapted to contact the surface of the copy sheet;
(4) dispensing means to controllably dispense ink from said reservoir to between said electrodes into the apex formed by the convergence thereof;
(5) a terminal for receipt of a signal voltage;
(6) drive means operative to effect continuous rotation of said turret with the stylus thereon in continuous contact with the copy sheet on its support as the electrodes pass thereover; and (c) a signal source connected to said terminal for emitting voltage signals representative of intelligence information to be recorded to cause ink at the apex of said electrodes to deposit onto said copy sheet for the duration of said signal.

13. The apparatus according to claim 12 in which said recording means includes a plurality of styli displaced about the circumference of said turret and at least one of which continuously contacts the copy sheet during rotation of said turret.

14. The apparatus according to claim 12 in which the rotational rate of said turret produces an acceleration force against the ink on said stylus of at least 24 g's.

15. A recording pen for depositing ink onto a copy sheet supported on an electrically conductive support in response to an electrical signal comprising:
(a) a plurality of closely spaced wires forming a single writing tip arranged to extend towards the surface of the copy sheet with each adjacent pair of wires capable of retaining a small quantity of liquid ink by surface tension near the surface of the copy sheet, ink in each space between said wires to be simultaneously deposited on the copy sheet to form a single recording mark indicative of intelligence information,
(b) means to simultaneously apply said electrical signal to ink retained in all of the spaces between the plurality of wires, said signal being representative of intelligence information to be recorded and of sufficient magnitude to overcome the surface tension of the ink causing a flow of ink from each of said spaces to the copy sheet substantially during the duration of said signal.

16. A pen according to claim 15 wherein the wires are arranged to extend into contact with the said copy sheet and are substantially parallel to each other.

17. A pen for depositing ink onto a copy sheet mounted on an electrically conductive support in response to an electrical signal comprising:
(a) a plurality of wires arranged to extend toward the surface of said copy sheet and capable of retaining a quantity of liquid ink by surface tension in spaces between them;
(b) a lip member arranged to extend over the length of the wires and narrowly spaced therefrom at the ends adjacent to the copy sheet to define a pocket therebetween for retaining ink by surface tension;
(c) a terminal electrically connected to ink retained in said pocket and adapted to receive electrical signals representative of intelligence information to be recorded and of magnitude sufficient to overcome the surface tension of the ink retained in said pocket whereby ink is deposited onto the copy sheet for substantially the duration of the signal.

18. A pen according to claim 17 wherein the wires are arranged to extend into contact with the copy sheet and are substantially parallel with respect to each other.

19. A recording pen for depositing ink onto a copy sheet having an electrically conductive support in response to an electrical signal comprising:
(a) a plurality of wires arranged to extend toward the surface of the copy sheet and capable of retaining ink near the surface of the copy sheet in spaces between adjacent wires;
(b) a lip member arranged to extend generally over the length of said wires and narrowly spaced to the wires at their ends adjacent to the copy sheet to define a pocket therebetween for retaining liquid ink by surface tension;
(c) a liquid ink reservoir arranged adjacent to the lip member and means for dispensing ink onto said pocket;
(d) a terminal electrically connected to the lip member and adapted to receive electrical signals representative of intelligence information to be recorded and of magnitude sufficient to overcome the surface tension of the ink to cause the deposit of ink onto the copy sheet for substantially the duration of the signal.

20. A recording pen according to claim 19 wherein the wires are arranged to extend into contact with a copy sheet and are substantially parallel to each other.

21. A pen for depositing ink onto a copy sheet mounted on an electrically conductive support in response to an electrical signal comprising:
(a) a plurality of finely separated elongated electrodes arranged to extend generally into contact with the surface of the copy sheet;
(b) a liquid ink reservoir mounted adjacent to said electrodes and containing a quantity of liquid ink and having means for dispensing the ink onto said electrodes;
(c) a lip member extending generally over the length of said electrodes and narrowly spaced therefrom at the ends in contact with the copy sheet and relatively more widely spaced along the length thereof to define a pocket therebetween in which ink dispensed from said reservoir is retained in the absence of said electrical signal by surface tension;
(d) a terminal electrically connected to ink retained in said pocket and adapted to receive an electrical signal to cause ink retained in said pocket to deposit onto the surface of the copy sheet for substantially the duration of the electrical signal.

References Cited
UNITED STATES PATENTS

| | | | |
|---|---|---|---|
| 1,097,131 | 5/1914 | Kitsee | 178—91 |
| 1,550,048 | 8/1925 | Ruben | 346—140 X |
| 2,487,865 | 11/1949 | Glassey. | |
| 3,052,213 | 9/1962 | Schaffert | 95—1.7 X |
| 3,270,637 | 9/1966 | Clark | 95—1 |
| 3,289,211 | 11/1966 | Klavsons et al. | 346—140 |

RICHARD B. WILKINSON, *Primary Examiner.*

J. W. HARTARY, *Assistant Examiner.*